US012435458B2

(12) United States Patent
Chung et al.

(10) Patent No.: US 12,435,458 B2
(45) Date of Patent: Oct. 7, 2025

(54) INITIATING A LAUNDRY TREATMENT OPERATION UTILIZING LIGHTING SEQUENCES

(71) Applicant: Haier US Appliance Solutions, Inc., Wilmington, DE (US)

(72) Inventors: MyungGeon Chung, Seoul (KR); Jongdeok Jang, Incheon (KR); Jee Eun Oh, Anyang (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 380 days.

(21) Appl. No.: 17/974,127

(22) Filed: Oct. 26, 2022

(65) Prior Publication Data

US 2024/0141576 A1 May 2, 2024

(51) Int. Cl.

| | |
|---|---|
| ***D06F 34/04*** | (2020.01) |
| ***D06F 23/02*** | (2006.01) |
| ***D06F 34/30*** | (2020.01) |
| ***G08B 5/36*** | (2006.01) |
| *D06F 101/00* | (2020.01) |
| *D06F 105/58* | (2020.01) |

(52) U.S. Cl.

CPC .............. *D06F 34/04* (2020.02); *D06F 23/02* (2013.01); *D06F 34/30* (2020.02); *G08B 5/36* (2013.01); *D06F 2101/00* (2020.02); *D06F 2105/58* (2020.02)

(58) Field of Classification Search

None

See application file for complete search history.

(56) References Cited

U.S. PATENT DOCUMENTS

| | | | | |
|---|---|---|---|---|
| 11,098,430 | B2 | 8/2021 | Belveal et al. | |
| 11,238,255 | B2 | 2/2022 | Wang et al. | |
| 2014/0379860 | A1* | 12/2014 | Brocker | G05B 15/02 709/217 |
| 2017/0290077 | A1* | 10/2017 | Nilsson | H04W 12/04 |
| 2022/0095116 | A1* | 3/2022 | Abdollahian | G06K 7/1417 |
| 2023/0068447 | A1* | 3/2023 | Campbell, III | H04L 67/12 |
| 2024/0292048 | A1* | 8/2024 | Yu | G08C 17/02 |

FOREIGN PATENT DOCUMENTS

| | | | |
|---|---|---|---|
| CN | 107944326 | A | 4/2018 |
| KR | 20120087284 | A | 8/2012 |

* cited by examiner

*Primary Examiner* — Bernard G Lindsay

(74) *Attorney, Agent, or Firm* — Dority & Manning, P.A.

(57) ABSTRACT

A method of operating a laundry treatment appliance includes receiving an input command on the laundry treatment appliance; initiating a predetermined lighting sequence of at least one light source in response to receiving the input command; receiving a request for a remote connection from a remote device in response to initiating the predetermined lighting sequence; establishing the remote connection between the laundry treatment appliance and the remote device; and receiving laundry operation instructions from the remote device via the remote connection.

20 Claims, 4 Drawing Sheets

INITIATING A LAUNDRY TREATMENT OPERATION UTILIZING LIGHTING SEQUENCES

FIELD OF THE INVENTION

The present subject matter relates generally to laundry treatment appliances, and more particularly to methods of initiating commercial laundry treatment operations utilizing a blinking light pattern.

BACKGROUND OF THE INVENTION

Laundry appliances generally include washing machine appliances and dryer appliances. In recent years, it has become increasingly popular to provide features and methods that allow such laundry appliances to communicate with owners. For instance, an owner may configure a virtual account to pair with a particular laundry appliance. Subsequently, the virtual account may be able to receive notifications regarding the status or completion of a laundry cycle (e.g., wash cycle, dry cycle, etc.).

Although such features can allow an owner to monitor the status of a laundry appliance even when the owner is apart from the appliance, they have drawbacks. In particular, the features may not be available to individuals or users of the laundry appliance who do not own the appliance. For example, many laundry appliances may be used by individuals who are not owners or do not intend to use the laundry appliance for more than a limited time period. This may be the case in many single-use environments for laundry appliances, such as may be found in a laundromat, dormitory, or apartment building, etc. Additionally or alternatively, current methods for establishing the remote connection between the appliance and the remote device have drawbacks, For instance, some methods involve attaching (e.g., via adhesive) a scannable code such as a QR code to the appliance which can be captured by a camera on a mobile phone to initiate the connection. However, these codes can become obscured or damaged such that the code is unreadable by the camera. For another example, a string of characters (e.g., numbers and letters) may be provided on the appliance which can be manually entered by the user to establish the connection. However, oftentimes certain characters can be mistyped or replaced with similar looking characters.

Accordingly, systems and methods for allowing more accurate connection requests between appliances and remote devices for initiating laundry sessions would be beneficial. In particular, a laundry treatment system including at least one light source to provide a connection code would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a laundry treatment appliance is provided. The laundry treatment appliance may include at least one light source provided on an exterior thereof. The method may include receiving an input command on the laundry treatment appliance; initiating a predetermined lighting sequence of the at least one light source in response to receiving the input command; receiving a request for a remote connection from a remote device in response to initiating the predetermined lighting sequence; establishing the remote connection between the laundry treatment appliance and the remote device; and receiving laundry operation instructions from the remote device via the remote connection.

In another exemplary aspect of the present disclosure, a laundry operation system is provided. The laundry operation system may include a laundry treatment appliance including a user input panel; at least one light source provided on the user input panel; an input provided on the user input panel, the input selectively receiving input commands; a remote device configured to selectively interact with the laundry treatment appliance; and a controller operably coupled to the laundry treatment appliance, the at least one light source, the input, and the remote device, the controller configured to perform a connection operation. The connection operation may include receiving a first input command via the input; initiating a predetermined lighting sequence of the at least one light source in response to receiving the input command; capturing, via the remote device, the predetermined lighting sequence in response to initiating the predetermined lighting sequence; decoding the predetermined lighting sequence into a remote connection request; establishing a remote connection between the laundry treatment appliance and the remote device after decoding the predetermined lighting sequence; and receiving laundry operation instructions from the remote device via the remote connection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
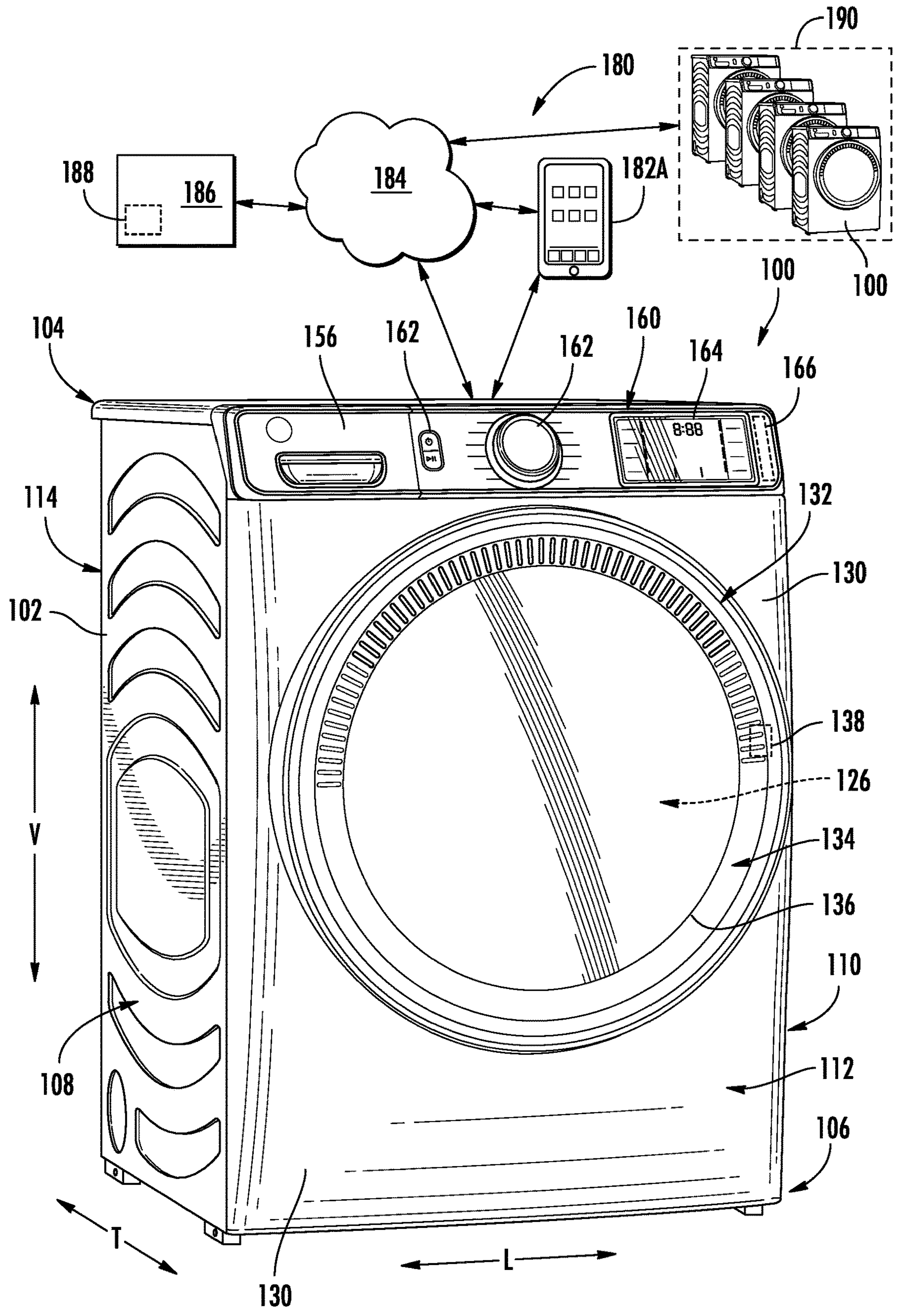
FIG. 1 provides a perspective view of an exemplary laundry appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term “or” is generally intended to be inclusive (i.e., “A or B” is intended to mean “A or B or both”). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms “a,” “an,” and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as “generally,” “about,” “approximately,” and “substantially,” are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise or counterclockwise, with the vertical direction V.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
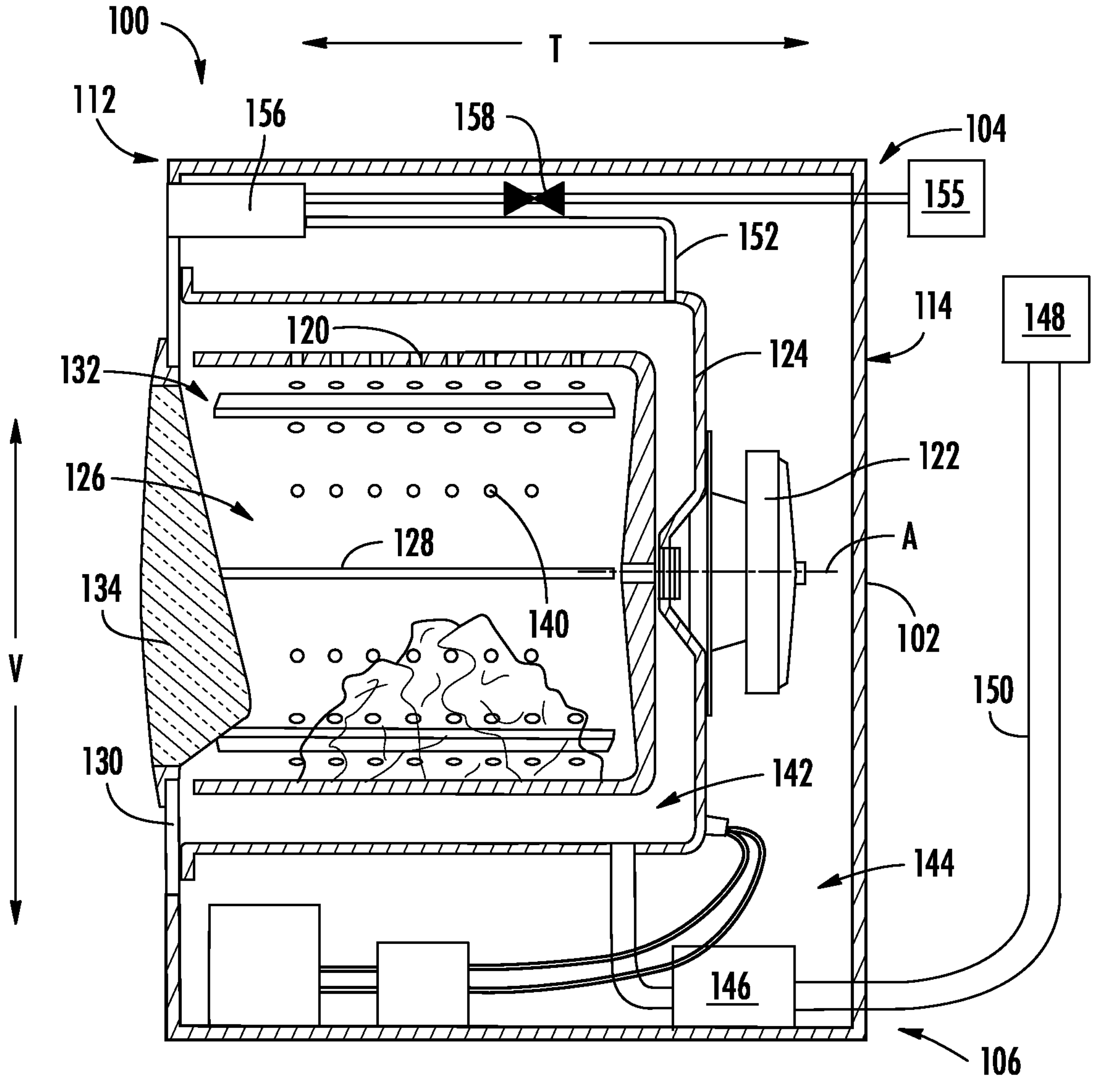
FIG. 2 provides a side cross-sectional view of the exemplary laundry appliance of FIG. 1.

Referring now to the figures, an exemplary laundry appliance that may be used to implement aspects of the present disclosure will be described. Specifically, FIG. 1 is a perspective view of an exemplary laundry appliance provided as a horizontal axis washing machine appliance 100. FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing or supporting various components of washing machine appliance 100 and which may also define one or more internal chambers or compartments of washing machine appliance 100. In this regard, as used herein, the terms “cabinet,” “housing,” and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as “left,” “right,” “front,” “rear,” “top,” or “bottom” are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a laundry or wash chamber 126 that is configured for receipt of articles for laundering (e.g., washing). The wash tub 124 holds wash and rinse fluids for agitation in wash basket 120 within wash tub 124. As used herein, “wash fluid” may refer to water, detergent, fabric softener, bleach, or any other suitable wash additive or combination thereof. Indeed, for simplicity of discussion, these terms may all be used interchangeably herein without limiting the present disclosure to any particular “wash fluid.”

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 or door 134 for selectively locking door 134 in the closed position or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present disclosure.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

During operation of washing machine appliance 100, laundry items are loaded into wash basket 120 through opening 132, and washing operation is initiated through operator manipulation of one or more input selectors or using a remote device (see below). Wash tub 124 is filled with water, detergent, or other fluid additives, e.g., via spout 152 or detergent drawer 156. One or more valves (e.g., water supply valve 158) can be controlled by washing machine appliance 100 to provide for filling wash basket 120 to the appropriate level for the amount of articles being washed or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, or rinsed, the user can remove the articles from wash basket 120, e.g., by opening door 134 and reaching into wash basket 120 through opening 132.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog or digital logic circuitry (such as switches, amplifiers, integrators, comparators, flip-flops, OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor of controller 166 or may be included onboard within such a processor. In addition, these memory devices can store information or data accessible by the one or more processors of controller 166, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform one or more methods, method steps, or portions of methods of appliance operation.

The memory devices of controller 166 may also store data that can be retrieved, manipulated, created, or stored by the one or more processors or portions of controller 166. The data can include, for instance, data to facilitate performance of methods described herein. The data can be stored locally (e.g., on controller 166) in one or more databases or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 180 will be described according to an exemplary embodiment of the present subject matter. In general, external communication system 180 is configured for permitting interaction, data transfer, and other communications between multiple discrete devices, such as a laundry appliance or more remote user devices. For example, this communication may be used to provide and receive operating parameters, user instructions or notifications, user preferences, or any other suitable information for engagement with washing machine appliance 100. In addition, it should be appreciated that external communication system 180 may be used to transfer data or other information to improve user interaction with laundry appliance or one or more remote user devices.

For example, external communication system 180 may permit controller 166 of washing machine appliance 100 to communicate with a separate device external to washing machine appliance 100, referred to generally herein as a remote user device 182A (e.g., of an owner or administrator having an owner account). As described in more detail below, these communications may be facilitated using a wired or wireless connection, such as via a network 184. In general, remote user device 182A may be any suitable device separate from washing machine appliance 100 that is configured with an owner account to provide or receive communications, information, data, or commands from a user. In this regard, remote user device 182A may be, for example, a personal phone, a smartphone, a tablet, a laptop or personal computer, a wearable device, a smart home system, or another mobile or external device.

Optionally, the remote user device 182A may include or be able to access a software application for interacting with the laundromat appliances. For instance, the remote user device 182A may be provided or associated with a particular user profile (e.g., an owner account) to interact with and operate each of the laundromat appliances.

In addition, a remote server 186 may be in communication with washing machine appliance 100 or remote user device 182A through network 184. In this regard, for example, remote server 186 may be a cloud-based server 186, and is thus located at a distant location, such as in a separate state, country, etc.

Generally remote server 186 may include a controller 188 (e.g., including one or more suitable processing devices, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. Controller 188 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor of controller 188 or may be included onboard within such processor. In addition, these memory devices can store information or data accessible by the one or more processors of the controller 188, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 188 may be operable to execute programming instructions or micro-control code associated with operation of or engagement with washing machine appliance 100. In this regard, the instructions may be software or any set of instructions that when executed by the processing device, cause the processing device to perform operations, such as running one or more software applications, displaying or directing a user interface, receiving user input, processing user input, transmitting a notification signal, etc. Moreover, it should be noted that controller 188 as disclosed herein is capable of and may be operable to perform one or more methods, method steps, or portions of methods of appliance operation. For example, in some embodiments, these methods may be embodied in programming instructions stored in the memory and executed by controller 188.

The memory devices of controller 188 may also store data that can be retrieved, manipulated, created, or stored by the one or more processors or portions of controller 188. The data can include, for instance, data to facilitate performance of methods described herein. As an example, the data may include a notification table that is associated with a particular appliance and in which guest accounts or addresses may be recorded and subsequently referenced in order to transmit notification signals corresponding to operation of the particular appliance 100. As will be described in detail below, conditions or limits to the notification table may be specified by an owner (e.g., via an owner account).

The data can be stored locally (e.g., on controller 188) in one or more databases or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 188 may further include a communication module or interface that may be used to communicate with washing machine appliance 100, controller 166, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, remote user device 182A may communicate with remote server 186 over network 184, such as the Internet (e.g., arrow 310), to transmit/receive data or information, provide user inputs, receive user notifications or instructions, interact with or control washing machine appliance 100, etc. In addition, remote user device 182A and remote server 186 may communicate with washing machine appliance 100 (e.g., arrow 340) to communicate similar information.

In general, remote user device 182A may be any suitable device separate from washing machine appliance 100 that is configured with a user account or profile to provide or receive communications, information, data, or commands from a user (e.g., washing commands for a commercial appliance). In this regard, remote user device 182A may be, for example, a personal phone, a smartphone, a tablet, a laptop or personal computer, a wearable device, a smart home system, or another mobile or external device.

Optionally, the remote user device 182A may include or be able to access a software application for interacting with the laundromat appliances. For instance, the remote user device 182A may be provided or associated with a particular user profile (e.g., a consumer account) to interact with and operate each of the laundromat appliances. Such a profile may include physical or digital wallets that contain credits (e.g., coupons, tokens, or digital currency) for performing one or more cycles of the various washers and dryers within a laundromat. Remote server 186 may be in communication with remote user device 182A through network 184.

In general, communication between washing machine appliance 100, remote user device 182A, remote server 186, or other user devices or appliances may be carried using any type of wired or wireless connection and using any suitable type of communication network, non-limiting examples of which are provided below. For example, remote user device 182A may be in direct or indirect communication with washing machine appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

External communication system 180 is described herein according to an exemplary embodiment of the present disclosure. However, it should be appreciated that the exemplary functions and configurations of external communication system 180 provided herein are used only as examples to facilitate description of aspects of the present disclosure. System configurations may vary, other communication devices may be used to communicate directly or indirectly with one or more associated appliances, other communication protocols and steps may be implemented, etc. These variations and modifications are contemplated as within the scope of the present disclosure.

While described in the context of a specific embodiment of horizontal axis washing machine appliance 100, using the teachings disclosed herein it will be understood that horizontal axis washing machine appliance 100 is provided by way of example only. Other laundry appliances having different configurations, different appearances, or different features may also be utilized with the present subject as well. Such laundry appliances may include a vertical axis washing machine appliance, dryer appliance, combined washer/dryer appliance, etc., as would be understood in light of the present disclosure.

Referring still to FIG. 1, washing machine appliance 100 may be utilized as a commercial washer in a laundromat or another commercial setting. In this regard, as used herein, discussion of the use of laundry appliances in a commercial setting may generally refer to the use of the appliance in any location where one or more appliances are provided for temporary use by consumers or users who do not own the appliance(s). These commercial settings may include laundromats that include a large number of washers and dryers that are configured for pay-per-use operation, e.g., via cash, coins, digital currency, or other forms of payment. Additionally or alternatively, these commercial settings may include rental properties (e.g., short-term or long-term rental properties) in which a temporary, non-owner user or guest will have access to the appliance(s) for only a limited (e.g., predetermined) period of time.

For example, as shown in FIG. 1, washing machine appliance 100 may be located in a commercial environment (e.g., as identified generally by reference numeral 190) along with other washing machine appliances, dryer appliances, etc. In some embodiments, each of the laundry appliances (e.g., washers or dryers) includes an appliance identifier or designation 300 (FIG. 3) to identify a particular laundry appliance at a remote user device 182A or remote server 186. Such an identifier 300 may be embedded or stored (e.g., within a corresponding controller 166 to be displayed at the display 164). Additionally or alternatively, the appliance identifier 300 may be encoded in a bar code, such as a QR code (300A) applied or fixed to a portion of the appliance (e.g., on the corresponding cabinet or control panel). Further additionally or alternatively, the appliance identifier may include a serial number or MAC address of the washing machine appliance. Yet further additionally or alternatively, the appliance identifier 300 may include a predetermined access code (300B) for adding a guest account to the notification table associated with a particular laundry appliance.

As will be described in further detail below, the appliance identifier 300 may be encoded in a lighting sequence. In detail, some appliances may incorporate a light source 302, such as a light emitting diode (LED) provided on control panel 160, to emit an encoded remote connection request in the form of a lighting sequence or series of flashes of the light source 302. A single light source 302 may be utilized to emit a predetermined lighting sequence or a plurality of lighting sequences. According to some embodiments, a single LED associated with an identifier on control panel 160 (e.g., a spin cycle notification, a fill notification, a cycle pause notification, etc.) is selectively activated and deactivated to emit the predetermined lighting pattern.

Figure 3:
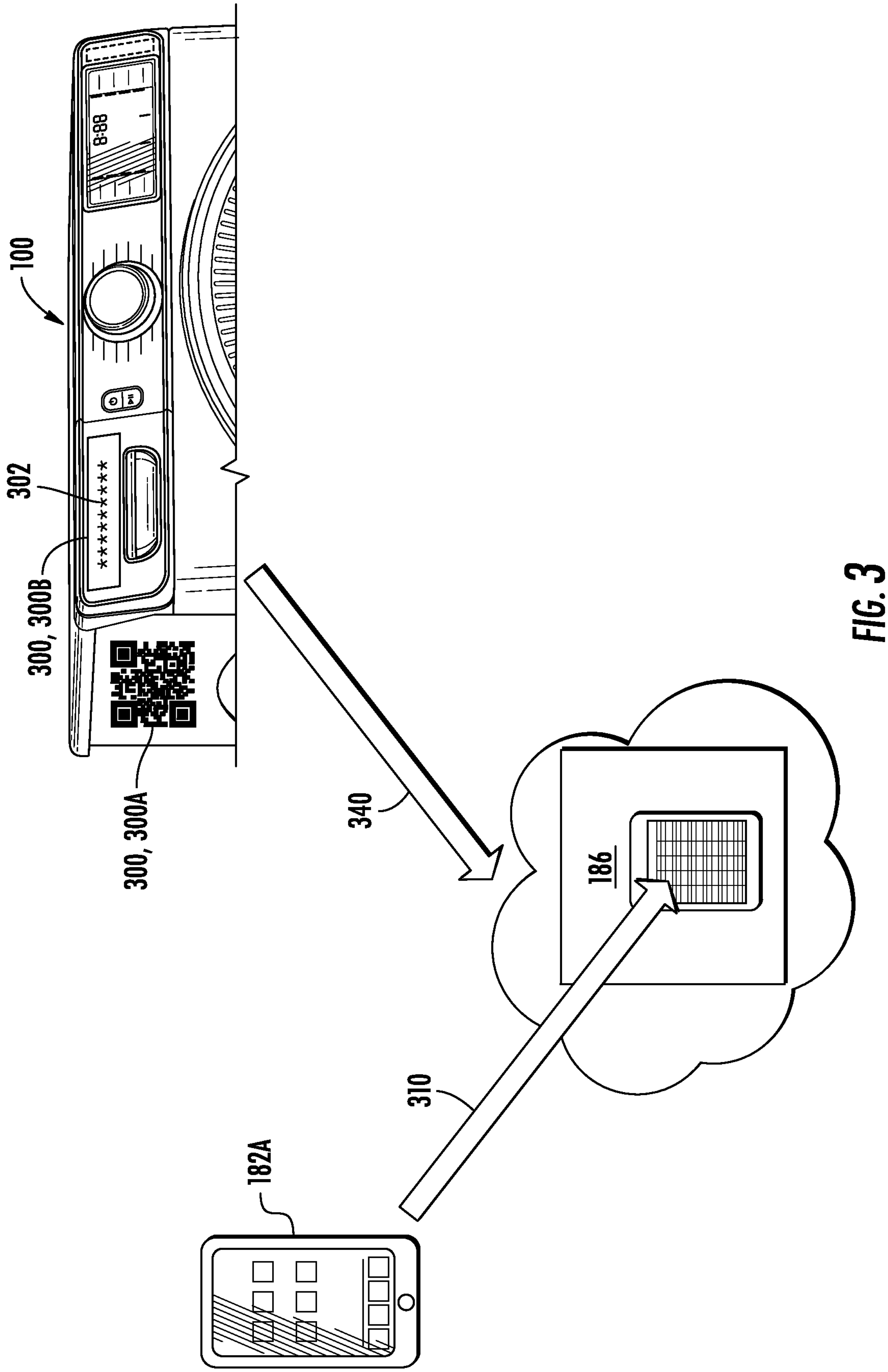
FIG. 3 illustrates communication between various user devices or accounts with a laundry in accordance with exemplary embodiments of the present disclosure.
Figure 4:
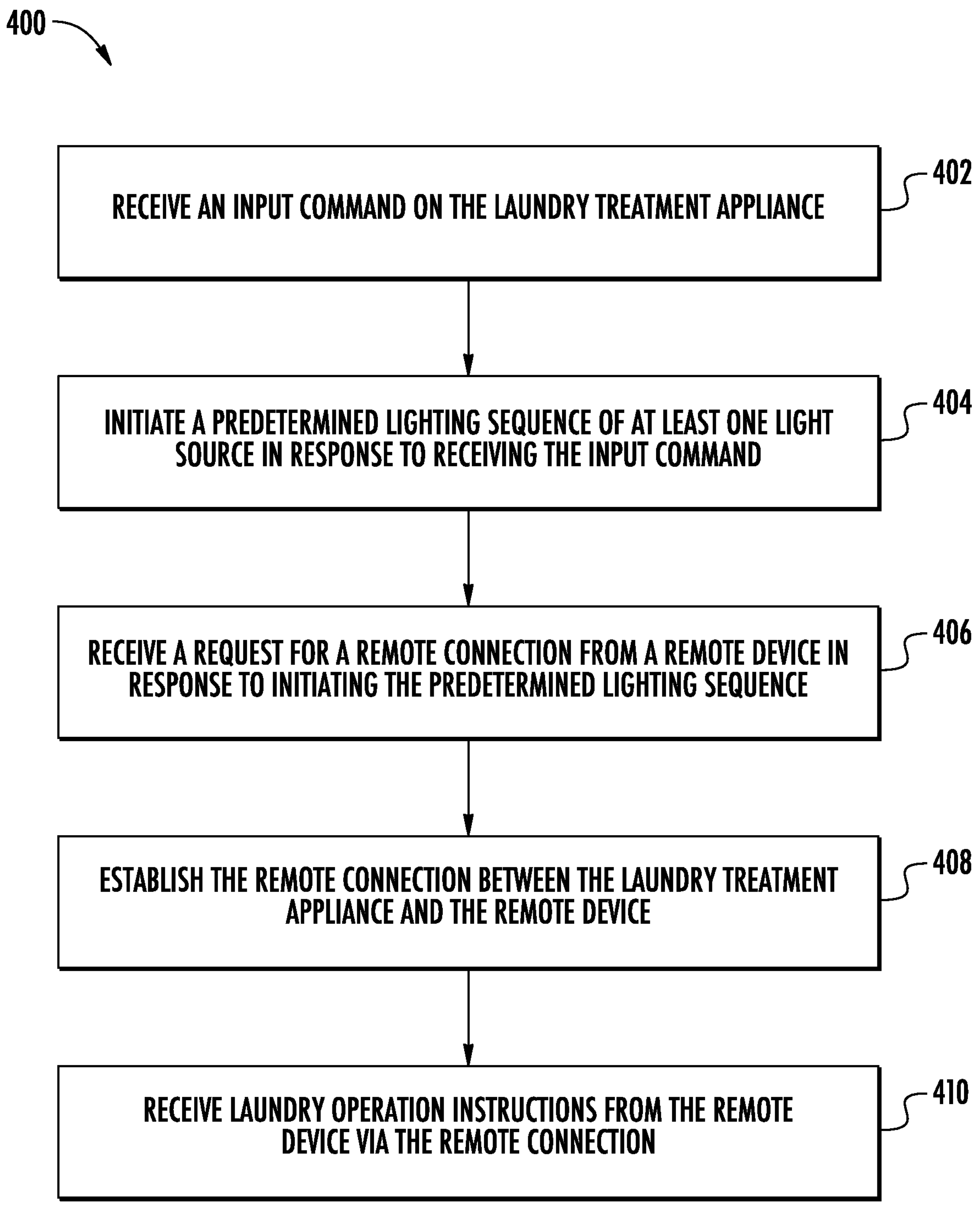
FIG. 4 provides a flow chart illustrating a method of operating a laundry appliance according to exemplary embodiments of the present disclosure.

Turning now to FIGS. 3 and 4, now that the construction of an exemplary laundry appliance (e.g., washing machine appliance 100), remote user device 182A, and remote server 186 have all been presented, exemplary methods for engagement with a laundry appliance are illustrated. In particular, illustration of communication and a flow chart are provided for a method 400 according to exemplary embodiments of the present disclosure. Generally, the method 400 provides a method of operating or engaging with a discrete laundry appliance (e.g., washing machine appliance 100—FIG. 1, dryer appliance, or combined washer/dryer appliance). The method 400 can be performed, for instance, by the controller 188 (FIG. 1) of a remote server 186 in communication with one or more remote devices 182A.

Advantageously, methods in accordance with the present disclosure may permit easy engagement of a laundry appliance's (e.g., a commercial laundry appliance's) operation with a temporary, non-owner user. Notably, engagement or connection may be generally dictated by one or more predetermined lighting sequences of a light source provided on or in the laundry appliance without requiring the user to manually enter a code or rely on a label removably attached to the appliance.

It is noted that FIG. 4 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At step 402, method 400 may include receiving an input command on the laundry treatment appliance. In detail, a prospective user of the appliance may indicate a desire to use the appliance (e.g., within a commercial setting such as a laundromat) by interacting with the appliance (e.g., physically). The input command may require a direct interaction between the user and the appliance. For instance, the input command may include an input interaction by the user. The input (e.g., input button, contact switch, dial, knob, etc.) may be provided on a control panel of the appliance. According to some embodiments, the input command includes a prolonged interaction with the input. As an example, the input command includes pressing and holding a physical button (e.g., a start button) for a prolonged or extended length of time. The extended length of time may be between about 1 second and about 3 seconds. Thus, the physical button may be held in an activated or engaged state for the extended length of time to indicate a request to connect.

At step 404, method 400 may include initiating a predetermined lighting sequence. In detail, the predetermined lighting sequence may be initiated utilizing at least one light source (e.g., an LED) provided on the control panel. The predetermined lighting sequence may be initiated in response to receiving the input command. For instance, upon determining that the button has been pressed and held for the extended length of time, the method 400 may initiate the predetermined lighting sequence at the light source. The light source may be one of a plurality of light sources provided on a user interface (e.g., control panel) of the appliance.

According to some embodiments, before initiating the predetermined lighting sequence, the method 400 may include deactivating the plurality of light sources. In detail, the method 400 may, via the controller, determine that one or more of the plurality of light sources are illuminated upon receiving the input command. Each of the plurality of light sources may be deactivated (e.g., not illuminated or held in an unilluminated state) prior to initiating the predetermined lighting sequence. Accordingly, only one of the plurality of light sources is used in emitting the predetermined lighting sequence.

The predetermined lighting sequence may include selective activation and deactivation of the at least one light source. In detail, the at least one light source may be either activated (e.g., to emit light) or deactivated (e.g., not emitting light) at predetermined time intervals. For one example, the predetermined time intervals include five time intervals. Thus, the at least one light source may be either activated or deactivated at each of the five distinct time intervals. Additionally or alternatively, the five time intervals may be spaced apart from each other by equal increments. For instance, the equal increments may be between about 0.1 second and 0.5 second.

Accordingly, the at least one light source may be activated or deactivated at each time interval. In some instances, the at least one light source remains activated or deactivated for the duration of the time interval. Thus, for a first time interval (e.g., 0.5 second), the at least one light source may be in an activated or illuminated state. After the expiration of the first time interval (e.g., after 0.5 second has elapsed), the activation or deactivation state of the at least one light source may be initiated. For one example, if the second time interval requires a deactivated state of the at least one light source, the at least one light source is deactivated at the expiration of the first time interval. This process may be repeated at each of the predetermined time intervals (e.g., at each of 5 time intervals).

The predetermined lighting sequence may include a plurality of predetermined lighting sequences. In detail, a specific lighting sequence (e.g., five distinct activations or deactivations of the light source) may be associated with an individual character (e.g., a letter or number). In detail, referring to the above example where five time intervals are incorporated into the predetermined lighting sequence, 120 unique lighting sequences may be formed. Each unique lighting sequence may include a unique pattern of activation and deactivation of the at least one light source (e.g., five successive times). Thus, a predetermined lighting sequence may be associated with a specific corresponding character. For one example, a code (e.g., MAC ID) includes a predetermined string of characters (e.g., twelve characters). The characters may include capital letters (e.g., A through Z) and single integers (e.g., 0 through 9). With 26 capital letters and 10 integers, a possible of 36 unique lighting sequences may be stored or registered, each lighting sequence corresponding to a different character. Advantageously, a code (e.g., string of characters) may be transmitted (e.g., by the appliance) by emitting twelve predetermined lighting sequences via the at least one light source. It should be noted that the numbers, amounts, and ranges described herein are given by way of example only, and that any suitable number of time intervals, length of time increments, and amount of unique lighting sequences may be utilized as specific applications warrant.

The predetermined lighting sequence (or plurality of lighting sequences) may be configured to be captured and decoded. For instance, a camera (e.g., digital camera) may capture the predetermined lighting sequences and decode the lighting sequences into a connection code (e.g., the MAC ID). For one example, a user may direct a camera of a smart mobile device (e.g., personal phone) at the at least one light source emitting the predetermined lighting sequence. The method 400 may include capturing the predetermined lighting sequence (e.g., at the mobile device). According to some embodiments, the captured sequence is transmitted to a remote server (e.g., remote server 186) to be decoded according to a specific algorithm. In alternate embodiments, the predetermined lighting sequence is decoded directly on the mobile device. Once the code (e.g., MAC ID) is decoded, the mobile device (e.g., remote device) may transmit a request to initiate a remote connection with the appliance.

At step 406, method 400 may include receiving a request for a remote connection from a remote device. In detail, after initiating the predetermined lighting sequence, the appliance may (e.g., via the controller) activate a wireless connection module to accept an incoming request to connect. Thus, the appliance may begin to "look" for connection requests (e.g., from one or more remote devices). As mentioned above, a corresponding remote device (e.g., mobile device) registered to a particular user may emit a request to establish a remote connection after decoding the predetermined lighting sequence.

At step 408, method 400 may include establishing the remote connection between the laundry treatment appliance and the remote device. The appliance may recognize the remote connection request from the remote device and approve the connection request. Accordingly, the appliance may create, for instance, a laundry session specific to the user of the remote device. For instance, a user profile may be stored on the remote device [e.g., within a mobile application (app)]. The user profile may include particular laundry settings for performing the laundry operation (e.g., laundry load size, water temperature, agitation power, spin speeds, detergent amounts, etc.).

At step 410, method 400 may include receiving laundry operation instructions from the remote device via the remote connection. Upon establishing the remote connection between the appliance and the remote device, the appliance may upload the required or requested laundry settings to be incorporated into the laundry operation. Additionally or alternatively, the appliance may accept a payment for use of the appliance via the remote connection (e.g., a virtual payment). Advantageously, according to the method described herein, users of commercial laundry treatment appliances can easily establish remote connections to upload laundry operation characteristics for performing the laundry operation. By utilizing a light source (e.g., LED) provided on the appliance, a reliable and accurate connection request can be delivered from the appliance to the remote device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry treatment appliance in a commercial environment, the laundry treatment appliance comprising a user input panel, the user input panel comprising a plurality of light sources provided on the user input panel and an input provided on the user input panel, the plurality of light sources comprising a single light source associated with an appliance identifier, the method comprising:

receiving an input command from the input provided on the user input panel;

initiating a predetermined lighting sequence of the single light source associated with the appliance identifier in response to receiving the input command;

activating, via a controller of the laundry treatment appliance, a wireless connection module in response to initiating the predetermined lighting sequence;

receiving a request for a remote connection from a remote device at the wireless connection module after the predetermined lighting sequence has been decoded at a remote server in operative communication with the laundry treatment appliance and the remote device;

establishing the remote connection between the laundry treatment appliance and the remote device; and receiving laundry operation instructions corresponding to laundry settings for a laundry session specific to a user of the remote device from the remote device via the remote connection.

2. The method of claim 1, further comprising:

deactivating the plurality of light sources before initiating the predetermined lighting sequence of the single light source associated with the appliance identifier.

3. The method of claim 1, wherein the predetermined lighting sequence comprises:

selective activation and deactivation of the single light source at predetermined time intervals corresponding to the appliance identifier.

4. The method of claim 3, wherein the predetermined time intervals comprise five time intervals spaced apart from each other by equal increments.

5. The method of claim 4, wherein the equal increments are between 0.1 second and 0.5 second.

6. The method of claim 1, further comprising:

capturing, via a camera of the remote device, the predetermined lighting sequence in response to initiating the predetermined lighting sequence.

7. The method of claim 1, wherein receiving the input command comprises:

detecting a constant button press for a predetermined time increment.

8. The method of claim 1, wherein the predetermined lighting sequence of the single light source comprises a plurality of unique lighting sequences, each unique lighting sequence being associated with an individual character of the appliance identifier.

9. The method of claim 1, wherein the single light source is a light emitting diode (LED) provided on a user input panel.

10. The method of claim 2, wherein deactivating the plurality of light sources before initiating the predetermined lighting sequence comprises:

determining that one or more of the plurality of light sources are illuminated upon receiving the input command, and holding the one or more of the plurality of light sources that are determined to be illuminated in an unilluminated state prior to initiating the predetermined lighting sequence of the single light source.

11. A laundry operation system comprising:

a laundry treatment appliance comprising a user input panel;

a plurality of light sources provided on the user input panel, the plurality of light sources comprising a single light source associated with an appliance identifier;

an input provided on the user input panel, the input selectively receiving input commands;

a remote device configured to selectively interact with the laundry treatment appliance; and a controller operably coupled to the laundry treatment appliance, the plurality of light sources, the input, and the remote device, the controller configured to perform a connection operation, the connection operation comprising:

receiving a first input command via the input;

deactivating the plurality of light sources in response to receiving the first input command;

initiating a predetermined lighting sequence of the single light source in response deactivating the plurality of light sources;

capturing, via a camera of the remote device, the predetermined lighting sequence in response to initiating the predetermined lighting sequence of the single light source;

decoding the predetermined lighting sequence into a remote connection request;

establishing a remote connection between the laundry treatment appliance and the remote device after decoding the predetermined lighting sequence; and receiving laundry operation instructions corresponding to laundry settings for a laundry session specific to a user of the remote device from the remote device via the remote connection.

12. The laundry operation system of claim 11, wherein the predetermined lighting sequence comprises:

selective activation and deactivation of the single light source at predetermined time intervals corresponding to the appliance identifier.

13. The laundry operation system of claim 12, wherein the predetermined time intervals comprise five time intervals spaced apart from each other by equal increments.

14. The laundry operation system of claim 13, wherein the equal increments are between 0.1 second and 0.5 second.

15. The laundry operation system of claim 11, wherein receiving the first input command comprises:

detecting a constant input command to the input for a predetermined time increment.

16. The laundry operation system of claim 11, wherein the predetermined lighting sequence of the single light source comprises a plurality of unique lighting sequence, each unique lighting sequence being associated with an individual character of the appliance identifier.

17. The laundry operation system of claim 11, wherein the single light source is a light emitting diode (LED) provided on the user input panel.

18. The laundry operation system of claim 11, wherein the connection operation further comprises:

activating a wireless connection module in response to initiating the predetermined lighting sequence.

19. The laundry operation system of claim 11, wherein the connection operation further comprises:

transmitting the predetermined lighting sequence to a remote server in operative communication with the laundry treatment appliance and the remote device in response to capturing the predetermined lighting sequence, wherein decoding the predetermined lighting sequence into the remote connection comprises:

decoding, at the remote server, the predetermined lighting sequence associated with the appliance identifier into the remote connection request.

20. The laundry operation system of claim 11, wherein the appliance identifier includes a MAC address of the laundry treatment appliance.

* * * * *